United States Patent
Le Bastard

(10) Patent No.: US 7,891,180 B2
(45) Date of Patent: Feb. 22, 2011

(54) ACTUATOR SERVO-CONTROL MONITORING METHOD AND DEVICE

(75) Inventor: Jean-Claude Le Bastard, Toulouse (FR)

(73) Assignee: Thales (FR)

(*) Notice: Subject to any disclaimer, the term of this patent is extended or adjusted under 35 U.S.C. 154(b) by 653 days.

(21) Appl. No.: 11/850,313

(22) Filed: Sep. 5, 2007

(65) Prior Publication Data

US 2008/0236382 A1 Oct. 2, 2008

(30) Foreign Application Priority Data

Sep. 5, 2006 (FR) .................................. 06 07757

(51) Int. Cl.
*F16D 31/02* (2006.01)
(52) U.S. Cl. ...................................................... 60/406
(58) Field of Classification Search ............... 91/363 A; 60/406; 244/194
See application file for complete search history.

(56) References Cited

U.S. PATENT DOCUMENTS 3,493,836 A * 2/1970 Nelson ........................ 244/194
4,473,876 A * 9/1984 Minnich ..................... 91/363 A
4,542,679 A 9/1985 Murphy et al.
5,319,296 A 6/1994 Patel

FOREIGN PATENT DOCUMENTS

WO 2006014997 2/2006

* cited by examiner

*Primary Examiner*—F. Daniel Lopez
(74) *Attorney, Agent, or Firm*—Lowe Hauptman Ham & Berner, LLP

(57) ABSTRACT

An actuator displacement servo-control for aircraft flight controls is assisted by a hydraulic circuit, configured to deliver a hydraulic failure indication. The servo-control is generated from an actuator position indication and a position set-point indication computed by a computation unit. An alarm phase is opened on detection of a servo-control operating error and is kept open as long as the error is present. During the alarm phase it is determined whether the actuator is in blocked or divergent states. If blocked, it is determined whether the duration of the alarm phase exceeds a value $T_{conf2}$; If divergent, it is determined whether the duration of the alarm phase exceeds a value $T_{conf1}$. When blocked and the duration of the alarm phase does not exceed $T_{conf2}$, it is determined whether the hydraulic circuit indicates a hydraulic failure.

12 Claims, 3 Drawing Sheets

ACTUATOR SERVO-CONTROL MONITORING METHOD AND DEVICE

RELATED APPLICATIONS

The present application is based on, and claims priority from, France Application Number 0607757, filed Sep. 5, 2006, the disclosure of which is hereby incorporated by reference herein in its entirety.

TECHNICAL FIELD

The field of the invention is that of actuator servo-control monitoring methods and devices. The actuators concerned act, for example, on aircraft flight controls: such actuators are used, in particular, in helicopters.

BACKGROUND OF THE INVENTION

To stabilize and direct his craft, a helicopter pilot manually actuates piloting means (control stick, attitude control system and pedals) to act on the piloting axes of the helicopter (main rotor or tail rotor). A lateral or longitudinal displacement of the control stick can be used to respectively adjust the lateral or longitudinal axis of the helicopter by modifying the incidence of the blades of the main rotor. The attitude control system can be used to adapt the engine power to the flight conditions by modifying the angle of attack of the blades of the main rotor and can be used to modify the rate of climb and/or longitudinal speed of the helicopter. The pedals can be used to orient the nose of the helicopter by modifying the angle of attack of the blades of the tail rotor. The movement of the piloting means is sent, by means of mechanical transmissions, assisted power-wise by hydraulic circuits, to the piloting axes. The mechanical transmissions are, more often than not, arranged in series one after the other forming mechanical transmission subsystems. The assembly consisting of a piloting means, the mechanical transmission and the associated hydraulic circuit constitutes a flight control linked to the piloting axis concerned.

Helicopters are often equipped with an automatic pilot system, comprising a computation means and actuators, which acts on the flight controls, under the control of the pilot, in order to carry out two main functions: a first function to assist the pilot, and a second automatic pilot function.

When it assists the pilot in the manual control of his helicopter, the automatic pilot system can be used on the one hand to damp the changes to the machine to facilitate its control by the pilot, and on the other hand to maintain the current flight configuration (lateral and longitudinal attitudes, and bearing) so enabling the pilot to temporarily let go of the piloting means without being placed in a flight configuration that would be dangerous.

When it is in automatic pilot mode, the automatic pilot system can be used to servo-control one or more flight parameters (altitude, vertical rate of climb, longitudinal speed, lateral speed, bearing, navigation, etc.) on one or more set-point values previously chosen by the pilot.

To act on a flight control, the automatic pilot system uses a "series actuator", which is a linear mechanical actuator placed in series in the mechanical transmission subsystem. This actuator has a body and an output shaft, it is normally of the worm screw/nut type and it has a reduced power and a short response time. It converts an electrical control into a displacement of its output shaft relative to its body. The "series actuators" are said to be "mechanically irreversible", namely that they are distorted only when an electrical control is applied to them. In particular when the automatic pilot system is out of operation, the "series actuators" have no effect on the control of the helicopter. A neutral position of the series actuator corresponds to the position where the free end of its output shaft is at mid-travel.

A distinction is made between two types of failures, or operating errors that can affect the servo-control of an actuator acting on a flight control and being able to disturb the displacement of the actuator:
- a first type of failure covers all the failures originated from within the automatic pilot system, this type of failure relates, for example, to malfunctions of a series actuator or of a computer of the automatic pilot system producing the actuator position servo-control.
- a second type of failure covers all the failures originated from outside the automatic pilot system; this type of failure relates, for example, to hydraulic circuit operating errors.

The hydraulic circuit gives a power boost to the displacement, by the pilot or by the actuator, of the flight control and therefore assistance in piloting: with the hydraulic circuit active, the displacement of the flight control will require little energy from the pilot (in manual piloting mode) or from the actuator (in automatic pilot mode).

On a failure of the hydraulic circuit (a loss of hydraulic pressure, for example), the assistance is lost, and all the effort needed to displace the flight control will be supported fully either by the pilot (in manual piloting mode), or by the actuator (in automatic pilot mode). On the yaw flight control of the A109 helicopter for example, the pilot can overcome the loss of hydraulic assistance, involving a greater physical effort, but the actuator is not capable of this and therefore remains blocked in position.

In the prior art, on an automatic pilot system comprising a computer acting simultaneously on several flight controls corresponding to different piloting axes of the helicopter (roll, pitch and yaw), when a failure is detected, a servo-control monitoring device takes a safeguarding measure independently of the type of failure. This measure consists in completely disengaging the automatic pilot system, that is, disabling the generation of all the servo-controls intended for the actuators acting on flight controls, and recentring the position of the various actuators around their neutral position by means of independent power circuits.

This safeguarding measure is simple and very safe but it has the drawback of being very disadvantageous to the pilot of the helicopter. Indeed, the complete disengagement of the automatic pilot system leads to a significant increase in the pilot workload. To reduce the probability of complete disengagement of the automatic pilot system, it is necessary to limit the disabling of all the servo-controls produced by the computer to only those situations where the safeguarding measure cannot be reduced to disabling a single servo-control intended for a failed axis.

One solution of the prior art for solving this problem consists in using a dual hydraulic circuit, on all the flight controls of the helicopter, that is, on all the axes of the helicopter. When a failure occurs on a first hydraulic circuit, the second hydraulic circuit takes over and handles the function of the first hydraulic circuit. Only when both hydraulic circuits of all the axes of the helicopter fail simultaneously does the automatic pilot system no longer act.

This solution is not always implemented by the aircraft manufacturer given that it is not essential and it reduces economic viability. Such is the case on medium-sized helicopters, such as, for example, the A109LUH helicopter: for this craft, the loss of hydraulic assistance on the yaw axis is not prohibitive in as much as the pilot can still displace the flight controls and act on the tail rotor. However, on the main rotor, it is essential to have a hydraulic redundancy, in as much as the pilot cannot act on this rotor without hydraulic assistance.

SUMMARY OF THE INVENTION

The aim of the invention is to overcome this drawback. More specifically, the subject of the invention is a method of monitoring the displacement servo-control of an actuator acting on a flight control of an aircraft, the flight control being assisted power-wise by a hydraulic circuit, the hydraulic circuit being able to deliver a "hydraulic failure" indication, IPH, the servo-control being generated by a computation unit from an actuator position indication $POS_n$ and a position set-point indication $CDE_n$ computed by the computation unit, an alarm phase being initiated on detection of the presence of a servo-control operating error, the alarm phase being initiated at a time $t_0$ and being kept open as long as the error is present, wherein the alarm phase comprises at least the following steps:

determining whether the actuator is in a blocked state or in a divergent state, when the actuator is in the blocked state, determining whether the duration of the alarm phase exceeds a value $T_{conf2}$;

when the actuator is in the divergent state, determining whether the duration of the alarm phase exceeds a value $T_{conf1}$;

when the actuator is in the blocked state, if the duration of the alarm phase does not exceed a value $T_{conf2}$, determining whether the hydraulic circuit has delivered the "hydraulic failure" indication, IPH.

The method according to the invention is based on an analysis concerning the cause and the effects of failures of the first and second types. The analysis establishes that a failure of the first type is reflected:

either in a displacement of the actuator in a direction opposite to the direction set by the set-point, in which case the term "actuator divergent" applies, this situation leading to an uncontrolled movement of the helicopter: a safeguarding measure must be taken very quickly;

or in the immobilization of the actuator, in which case the term "actuator blocked" applies, this situation not provoking rapid movement of the helicopter, and a safeguarding measure to overcome such a failure can be taken with a slight delay because of its lesser severity.

The analysis also establishes that a failure of the second type is induced exclusively by a failure affecting the hydraulic circuit associated with the actuator and that this failure produces a blockage of the actuator.

Chronologically, the identification of the type of the failure follows the detection of the error. The cause of the blockage of the actuator is identified by a "hydraulic failure" indication delivered by a pressure gauge associated with the hydraulic circuit.

Thus, if a failure of the first type occurs on an automatic pilot system comprising a single computer that simultaneously controls flight controls on several axes of the helicopter (roll, pitch and yaw), there is a risk that the electronic failure will be propagated from one axis to another. In this situation, it is vitally important to completely disengage the automatic pilot system and to recentre the position of the various actuators around their neutral position by an independent power circuit. Such is the situation that is encountered in the case where the failure concerns a computer and disturbs the generation of a servo-control intended for an actuator. The effect produced can be either a displacement of the actuator in a direction opposite to the direction set by the servo-control or a blockage of a series actuator.

Similarly, on this same automatic pilot system, if a failure of the second type affects a single hydraulic circuit, a simple safeguarding measure, provided that no failure of the first type occurs at the same time, consists in disabling the generation of the servo-control intended for the actuator acting on the failed hydraulic circuit without in any way disabling the generation of the other servo-controls, unaffected by the failure.

The advantages of the inventive method include:

robustness: the detection of the errors is fairly insensitive to the accidental triggering situations like those encountered, for example, in a situation where the speed of the actuator drops because of a significant mechanical load induced by a low hydraulic pressure level or a low level of the electrical power supply to the actuator.

selectivity: differentiating the type of the failure can make it possible to avoid a total disabling of the automatic pilot system when a failure of the second type occurs affecting a single hydraulic circuit.

responsiveness: the different value sensitivity thresholds are applied according to the nature of the error detected. The speed with which a failure of the first type is detected is adapted so that the pilot can retake control of the helicopter quickly.

The invention also relates to a device for monitoring a displacement servo-control of an actuator, acting on a flight control of an aircraft, the flight control being assisted power-wise by a hydraulic circuit, the hydraulic circuit being able to deliver a "hydraulic failure" indication, IPH, the servo-control being generated, at a time $t_n$, from a position indication $POS_n$ of the actuator ACT at the time $t_n$ and a position set-point $CDE_n$ computed by a computation unit at the time $t_n$, wherein it comprises:

a detection unit UDET for determining, at the time $t_n$, where n is greater than or equal to 1:

the presence of a servo-control operating error;

whether the monitoring device receives a "hydraulic failure" indication IPH generated by the hydraulic circuit.

a validation unit UVA for:

opening an alarm phase when the presence of an error is detected;

keeping the alarm phase open as long as the detection unit UDET detects the presence of the error;

closing the alarm phase immediately the detection unit UDET no longer detects the presence of an error or immediately the generation, by the computation unit, of the displacement servo-control intended for the actuator is disabled.

a time-stamping unit UDA for:

determining the time $t_o$ at which the alarm phase is opened, determining, at the time $t_n$, where n is greater than or equal to 1, whether a duration of the alarm phase exceeds a value $T_{conf1}$ determining, at the time $t_n$, where n is greater than or equal to 1, whether the duration of the alarm phase exceeds a value $T_{conf2}$.

an analysis unit UAN for determining whether the error is linked to an actuator in the blocked state or to an actuator in the divergent state.

BRIEF DESCRIPTION OF THE DRAWINGS

Other characteristics and advantages of the invention will become apparent from reading the detailed description that follows, given as a nonlimiting example with reference to the appended drawings in which.

From one figure to another, the same elements are identified by the same references.

DETAILED DESCRIPTION OF THE INVENTION

Figure 1:
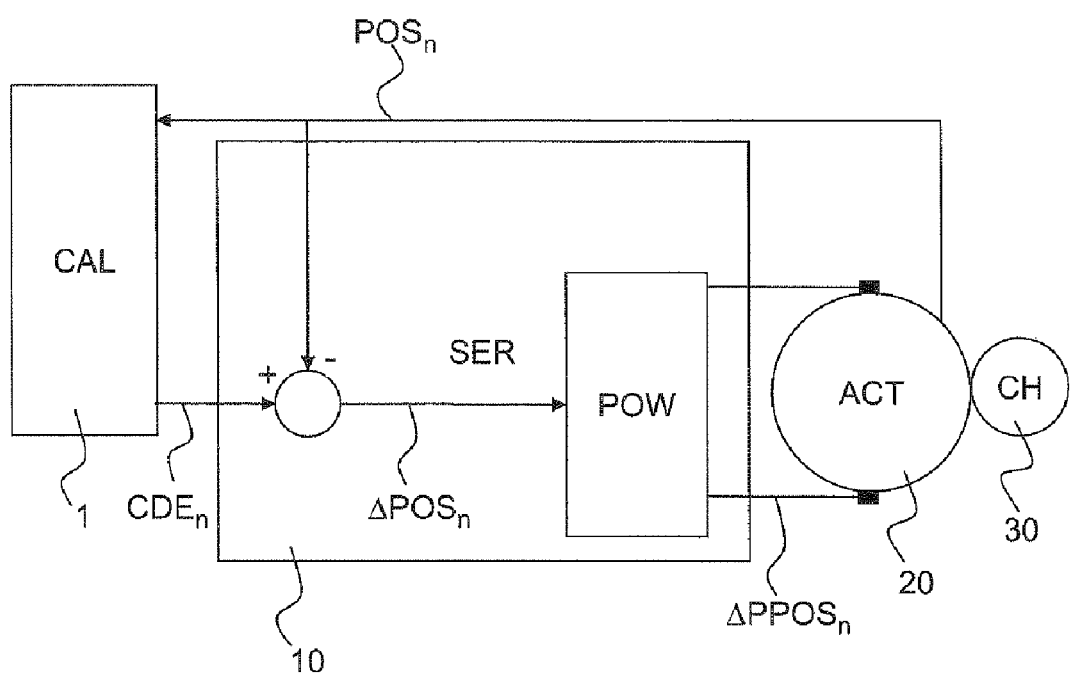
FIG. 1 diagrammatically represents a servo-control loop of an actuator according to the prior art.

FIG. 1 represents a position servo-control loop of an actuator acting on a flight control of an aircraft, the flight control being assisted power-wise by a hydraulic circuit. The flight control is not shown in the figure.

The servo-control loop is part of an automatic pilot system, and comprises:
  a computation unit CAL, 1;
  at least one servo-control and power circuit SER, 10,
  at least one actuator ACT, 20.

The actuator is, for example, a series actuator, the body of which is fixed. A displacement of the output shaft of the actuator is mechanically transmitted to the hydraulic circuit which transmits it in turn to a flight control.

The hydraulic circuit CH, 30 which is associated with the actuator, is not part of the automatic pilot system.

The computation unit CAL and the servo-control and power unit SER receive the position indication POS from the actuator ACT. The computation unit CAL generates a position set-point $CDE_n$ to be set at the end of the output shaft of the series actuator of the actuator ACT, at a time $t_n$. The position set-point $CDE_n$ is addressed to the servo-control and power unit, SER.

The servo-control unit SER calculates a difference $\Delta POS_n$ between the position set-point $CDE_n$ and the position $POS_n$ occupied by the actuator ACT. The value of this difference $\Delta POS_n$ constitutes the position servo-control difference, it is addressed to a power module POW which converts it into a power control $\Delta PPOS_n$ feeding the series actuator of the actuator ACT.

A copy of the position of the output shaft of the series actuator of the actuator ACT feeds the servo-control and power circuit SER and the computation unit CAL.

According to the prior art, when a computation unit CAL detects an error on the displacement of the actuator ACT, it disables the generation of the position set-point $CDE_n$. This operation is retained when the computation unit, CAL, generates different position set-points $CDE_n$ intended for several actuators, ACT, acting on different flight controls assisted power-wise by different hydraulic circuits, CH. The generation of all the set-points $CDE_n$ intended for the different actuators is disabled immediately an operating error is detected on the displacement of one of the actuators, ACT. The consequence of this operation is that the pilot of the aircraft is no longer assisted in his piloting tasks (whether in manual mode or in automatic pilot mode) by any of the actuators ACT, immediately a single actuator ACT exhibits a deviant displacement.

Figure 2:
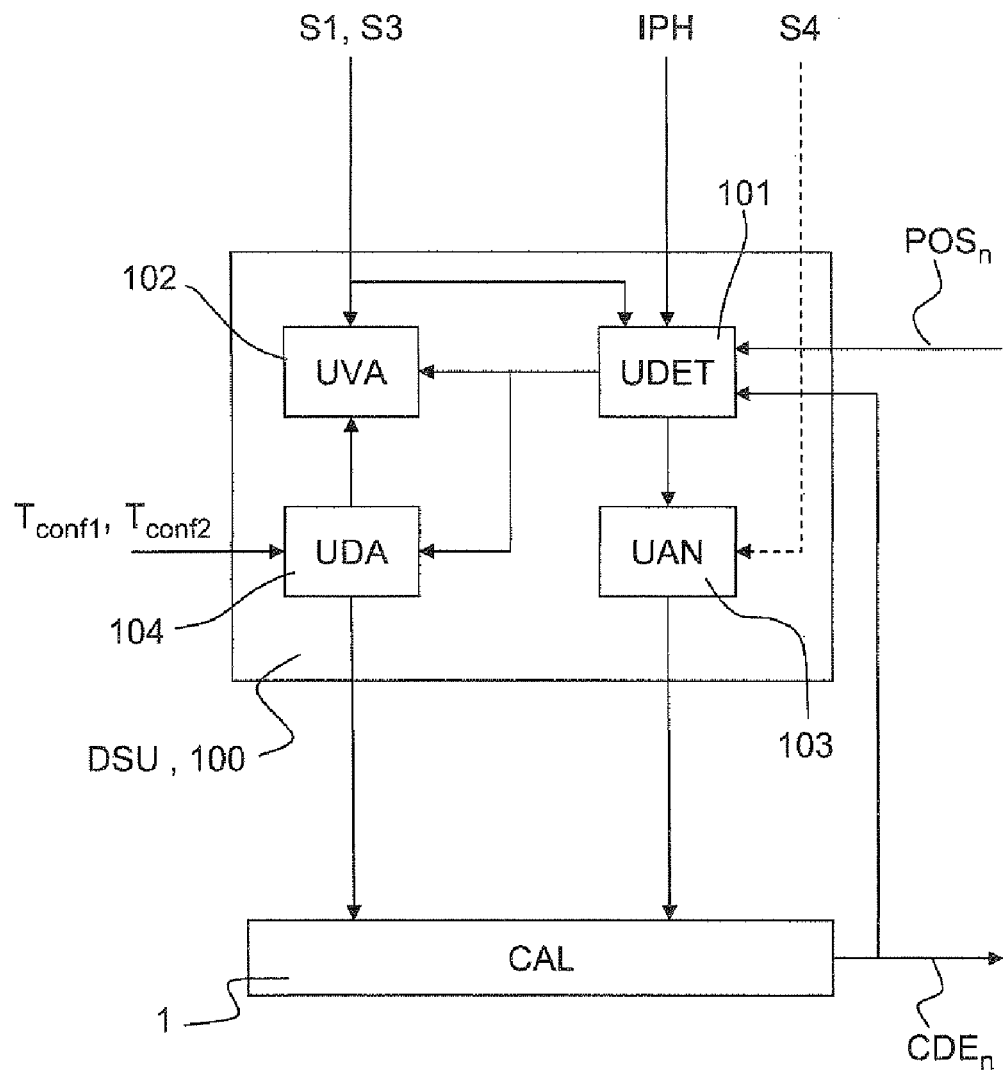
FIG. 2 diagrammatically represents a monitoring device according to the invention.

FIG. 2 diagrammatically represents a monitoring device DSU, 100, according to the invention that overcomes this drawback.

The monitoring device DSU is part of the automatic pilot system and comprises:
  a detection unit UDET, 101;
  a validation unit UVA, 102;
  an analysis unit UAN, 103;
  a time-stamping unit UDA, 104;
  a computer CCA, 105.

The detection unit UDET determines whether the monitoring device DSU receives a "hydraulic failure" indication IPH originating from the hydraulic circuit CH associated with the actuator ACT.

Advantageously, the hydraulic circuit includes a pressure gauge delivering the "hydraulic failure" indication IPH.

The detection unit UDET, fed by the position indication $POS_n$ from the actuator and the position set-point $CDE_n$ at a time $t_n$, detects the presence of an operating error on the servo-control by means of two parameters S1 and S3, the values of which have to be fixed.

When a servo-control error is detected by the unit UDET, the validation unit UVA opens an alarm phase. The validation unit UVA keeps the alarm phase open as long as the detection unit UDET continues to detect an error and closes the alarm phase immediately the unit UDET no longer detects any error, or immediately the generation of the displacement servo-control intended for the actuator (20) is disabled. The detection of the persistence of the error by the unit UDET is subject to the same criteria as the detection of the appearance of the error.

The time-stamping unit UDA determines the time $t_o$ at which the alarm phase is opened.

Advantageously, the alarm phase is opened at a time $t_0$, wherein the steps of the alarm phase are repeated sequentially at times $t_n$; where n represents a repetition index of the steps of the alarm phase.

Hereinafter, $t_n$ defines a time that chronologically follows the opening of an alarm phase.

The value of the threshold S1 corresponds to a maximum speed of displacement of the actuator ACT below which the actuator is considered to be immobile. The unit UDET assesses the existence of an error at the time $t_n$ and, for this, it assesses the position of the actuator at this time $t_n$. If the time interval between two successive times $t_n$, that is, if $t_{n+1}-t_n$ is constant, the parameter S1 can be expressed in the form of a minimum distance traveled by the actuator during the duration $t_{n+1}-t_n$. S1 should have a value greater than the noise that can interfere with the position indication $POS_n$ from the actuator.

For the yaw axis of a A109 LUH-type helicopter, a value of S1 is chosen to be equal, for example, to 0.1 millimetre, which corresponds, if the duration $t_{n+1}-t_n$ between two successive determinations of error presence is 20 milliseconds, to a movement of average minimum speed equal to millimetres/second.

Moreover, the value of the threshold S3 corresponds to the minimum value of the difference between the position $POS_n$ of the actuator (20) and the set-point $CDE_n$ so that its speed reaches at least the value $S1/(t_{n+1}-t_n)$ over the duration $t_{n+1}-t_n$. The value of S3 must take account of the errors associated with the acquisition of the position $POS_n$ of the actuator (20) and of the errors associated with the position servo-control loop of the actuator (20).

For the yaw axis of a A109 LUH-type helicopter, a value of S3 is chosen, for example, to be equal to 0.4 millimetre.

Advantageously, n being greater than or equal to 1, a position $POS_n$ being occupied by the actuator (20) at the time $t_n$, $\Delta P_{n,n-1}$, being a difference between $POS_n$ and $POS_{n-1}$, $\Delta PC_n$ being a difference between $POS_n$ and a position set-point $CDE_n$ at the time $t_n$, $\Delta d_n$ being a difference between $POS_n$ and the position $POS_0$ that the actuator (20) occupied at the time $t_0$, an error detection comprises steps consisting in:
comparing the absolute value of the difference $\Delta PC_n$ with a threshold S3;
comparing the absolute value of the difference $\Delta P_{n,n-1}$ with a threshold S1;
comparing the sign of the difference $\Delta P_{n,n-1}$ with the sign of the difference $\Delta PC_n$.

Advantageously, the presence of a servo-control operating error is detected if at least one of the following conditions is satisfied:
the absolute value of the difference $\Delta PC_n$ is greater than the threshold S3 and the absolute value $\Delta P_{n,n-1}$ is less that the threshold S1,
the absolute value of the difference $\Delta PC_n$ is greater than the threshold S3 and the sign of $\Delta P_{n,n-1}$ is different from the sign of the difference $\Delta PC_n$.

At each instant $t_n$, the time-stamping unit UDA determines whether the duration of the alarm phase exceeds a value $T_{conf1}$ or even whether the duration of the alarm phase exceeds a value $T_{conf2}$.

The value of the parameter $T_{conf1}$ corresponds to the minimum duration needed at the end of the output shaft of the series actuator of the actuator ACT to change the direction of displacement. This duration is directly dependent on the dynamic characteristics of the actuator ACT. For example, for an actuator on an A109 LUH-type helicopter, $T_{conf1}$ takes the value 40 milliseconds.

The value of the parameter $T_{conf2}$ corresponds to the duration of the delay with which the hydraulic loss indication is known to the computation unit. For example, on a device according to the invention fitted in an A109 LUH-type helicopter, $T_{conf2}$ takes the value 0.4 second.

Advantageously, the duration $T_{conf2}$ is greater than the duration $T_{conf1}$.

Advantageously, the duration $T_{conf1}$ is less than or equal to 50 milliseconds.

Advantageously, the duration $T_{conf2}$ is less than or equal to 500 milliseconds.

Moreover, at each instant $t_n$, the analysis unit UAN determines whether the error is provoked by the blocked state or by the divergent state of the actuator. For this, the analysis unit employs a parameter S4, the value of which has to be set.

Advantageously, a determination is made as to whether the actuator is in the divergent state if the following conditions are satisfied:
the absolute value of the difference $\Delta d_n$ is greater than the threshold S4,
the differences $\Delta d_n$ and $\Delta PC_n$ have opposite signs.

Advantageously, a determination is made as to whether the actuator is in the blocked state if the actuator is not in the divergent state.

The value of the parameter S4 corresponds to the minimum value of the displacement of the actuator ACT below which the actuator ACT is considered to be blocked. The value of the threshold S4 should be greater than the internal play of the actuator ACT. On an A109 LUH-type helicopter, the value of S4 is, for example, 0.3 millimetre.

Figure 3:
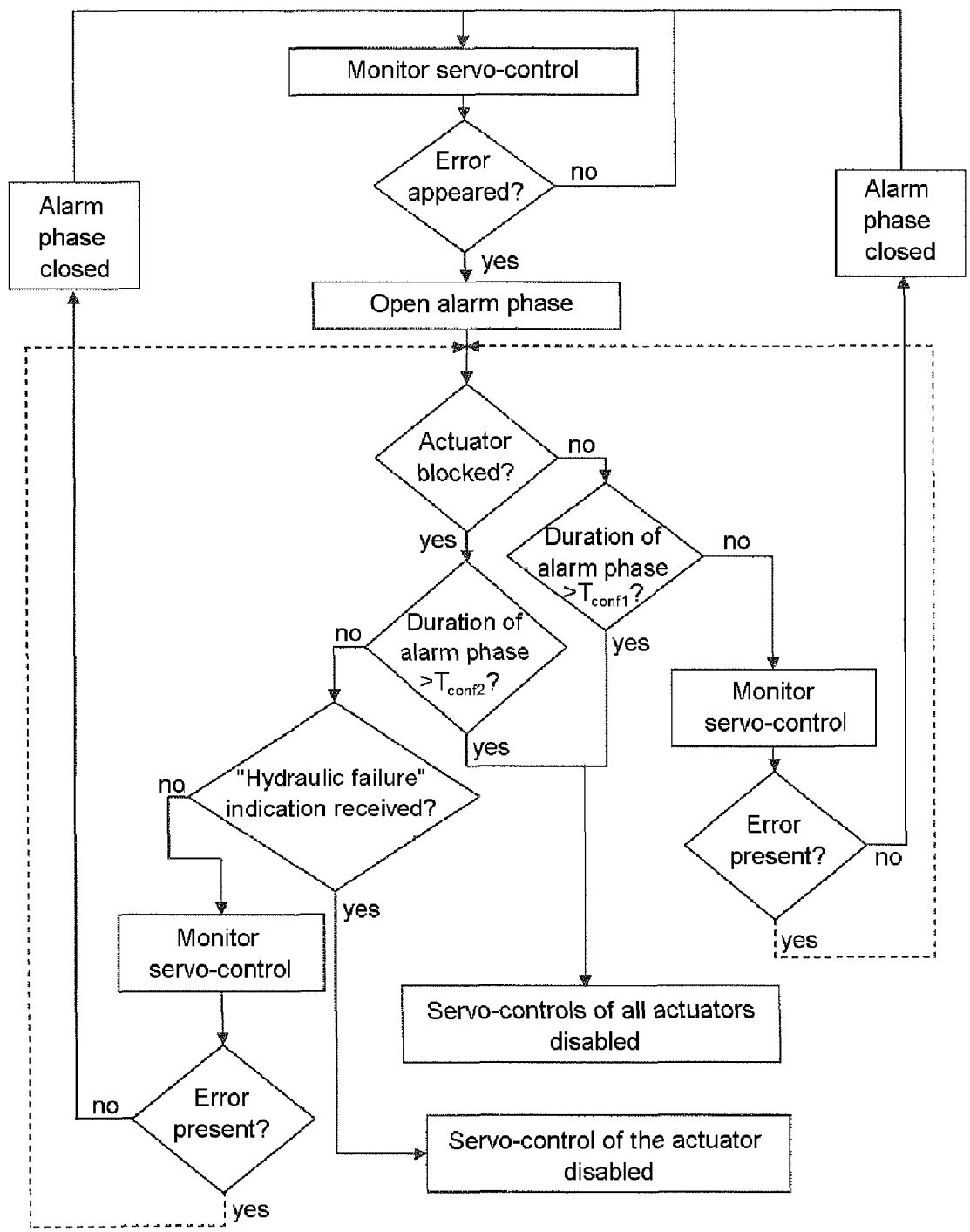
FIG. 3 represents a flow diagram of the monitoring method according to the invention.

FIG. 3 is a flow diagram showing the steps of a method of monitoring a servo-control according to the invention.

A first phase of the method consists in monitoring the appearance of a servo-control error. This monitoring is based on a collection, periodic or otherwise, of information at the times $t_n$, concerning the position of the actuator, concerning the displacement set-point and concerning a "hydraulic failure" indication IPH originating from the pressure gauge in the hydraulic circuit indicating if the hydraulic pressure of the hydraulic circuit falls below a certain threshold.

Immediately an error is detected, an alarm phase is opened and kept open as long as the presence of the error is detected. The persistence of the presence of the error is also detected at the times $t_n$.

Once an alarm phase is opened, a check is made as to whether the opening is accidental, in other words, that the error that triggered the opening does not correspond to an artefact, to a very brief false alarm. There is therefore a wait to see if the error is present over a certain continuous duration before taking a corrective measure to form a robust monitoring device that is fairly insensitive to accidental triggering.

As has been seen, the consequences induced by a divergent state of an actuator are potentially more rapidly dangerous than those induced by a blocked state of the same actuator, so it is reasonable to wait for a shorter duration to take a corrective measure if in the presence of an actuator in the divergent state than if in the presence of an actuator in the blocked state. Thus, if the actuator is in the divergent state, there is a wait to see if the error occurs over a duration $T_{conf1}$, and if the actuator is in the blocked state, there is a wait to see if the error occurs over a duration $T_{conf2}$ with $T_{conf1}$ less than $T_{conf2}$.

At the time $t_n$, the duration of the alarm phase is calculated by subtracting the time $t_n$ and the time $t_0$.

Advantageously, at the time $t_n$, where n is greater than or equal to 1, if the actuator is in the blocked state, the duration of the alarm phase exceeds the value $T_{conf2}$, or if the actuator is in the divergent state and the duration of the alarm phase exceeds the value $T_{conf1}$, the generation of all the displacement servo-controls, produced by the computation unit and intended for actuators acting on the flight controls, is disabled and the alarm phase is closed.

Advantageously, at the time $t_n$, where n is greater than or equal to 1, if the actuator is in the blocked state, the duration of the alarm phase does not exceed the value $T_{conf2}$, and no "hydraulic failure" indication IPH is received, or if the actuator is in the divergent state and the duration of the alarm phase does not exceed the value $T_{conf1}$, a determination is made as to whether the alarm phase is closed or if the steps of the alarm phase are repeated an additional time, based on the presence of an error at the time $t_{n+1}$.

According to the prior art, the safeguarding measure, or corrective measure, corresponds to a disabling of the generation of all the servo-controls intended for actuators acting on a flight control by means of a hydraulic circuit.

In a situation where the error corresponds to an actuator in the blocked state or where this state of the actuator is caused by a failure of the hydraulic circuit associated with it, such a safeguarding measure proves disadvantageous to the pilot. Indeed, the automatic pilot system is totally disengaged when there is no fear of the error affecting all the servo-controls of the actuators. It is therefore sensible to distinguish whether the blocked state of the actuator is caused by a "hydraulic failure". Should a hydraulic failure be detected, the safeguarding measure corresponds to a disabling of the generation of only the servo-control intended for the actuators for which blockage is detected.

A delay with which the pressure gauges of the hydraulic circuits deliver a "hydraulic failure" indication, IPH, is taken into account by implementing the safeguarding measure immediately the "hydraulic failure" indication, IPH, is known.

Advantageously, at the time $t_n$, where n is greater than or equal to 1, if the actuator is in the blocked state and a duration of the alarm phase exceeds the value $T_{conf2}$ or if the actuator is in the divergent state and the duration of the alarm phase exceeds the value $T_{conf1}$, the generation of all the displacement servo-controls, produced by the computation unit and intended for actuators acting on flight controls, is disabled and the alarm phase is closed.

Advantageously, at the time $t_n$, where n is greater than or equal to 1, if the actuator is in the blocked state, the duration of the alarm phase does not exceed the value $T_{conf2}$ and a "hydraulic failure" indication is received, the generation of the displacement servo-control, produced by the computation unit and intended for the actuator, is disabled and the alarm phase is closed.

The invention claimed is:

1. A method of monitoring movement of a plurality of actuators, each acting on a flight control of an aircraft, which is implemented by a monitoring device applied on the aircraft, wherein the flight control is assisted power-wise by a hydraulic circuit and the hydraulic circuit being able to deliver a hydraulic failure indication, a displacement servo-control for each actuator is generated from a respective actuator position indication and a respective position set-point indication computed by a computation unit, wherein an alarm phase is initiated on detection of the presence of a servo-control operating servo-control operating error, the alarm phase is initiated at a time $t_0$ and being kept open as long as the error is present, wherein the alarm phase comprises the following steps:

determining whether at least one actuator is in a blocked state or in a divergent state,
when the at least one actuator is in the blocked state, determining whether the duration of the alarm phase exceeds a value $T_{conf2}$;
when the at least one actuator is in the divergent state, determining whether the duration of the alarm phase exceeds a value $T_{conf1}$; and
when the at least one actuator is in the blocked state, if the duration of the alarm phase does not exceed a value $T_{conf2}$, determining whether the hydraulic circuit has delivered the hydraulic failure indication,
wherein at a time $t_n$, where n is greater than or equal to 1,
(i) if the at least one actuator is in the blocked state and the duration of the alarm phase exceeds the value $T_{conf2}$, or if the at least one actuator is in the divergent state and the duration of the alarm phase exceeds the value $T_{conf1}$, the generation of all the displacement servo-controls, produced by the computation unit and intended for the actuators acting on the flight controls, is disabled and the alarm phase is closed, or
(ii) if the at least one actuator is in the blocked state, the duration of the alarm phase does not exceed the value $T_{conf2}$, and a hydraulic failure indication is received, the generation of the displacement servo-control, produced by the computation unit and intended for the at least one actuator, is disabled and the alarm phase is closed.

2. The monitoring method according to claim 1, wherein the steps of the alarm phase are repeated sequentially at the time $t_n$; where n represents a repetition index of the steps of the alarm phase.

3. The monitoring method according to claim 2, wherein n is greater than or equal to 1, a position $POS_n$ being occupied by the at least one actuator at the time $t_n$, $\Delta P_{n,n-1}$ being a difference between $POS_n$ and $POS_{n-1}$, $\Delta PC_n$ being a difference between $POS_n$ and a position set-point $CDE_n$ at the time $t_n$, $\Delta d_n$, being a difference between $POS_n$ and the position $POS_0$ that the at least one actuator occupied at the time $t_0$, wherein, an error detection comprises the steps comprising:

comparing the absolute value of the difference $\Delta PC_n$ with a threshold S3;
comparing the absolute value of the difference $\Delta P_{n,n-1}$ with a threshold S1; and
comparing the sign of the difference $\Delta P_{n,n-1}$ with the sign of the difference $\Delta PC_n$.

4. The monitoring method according to claim 3, wherein the presence of a servo-control operating error is detected if at least one of the following conditions is satisfied:

the absolute value of the difference $\Delta PC_n$ is greater than the threshold S3 and the absolute value of $\Delta P_{n,n-1}$ is less than the threshold S1;
the absolute value of the difference $\Delta PC_n$ is greater than the threshold S3 and the sign of the difference $\Delta P_{n,n-1}$ is different from the sign of the difference $\Delta PC_n$.

5. The monitoring method according to claim 3, wherein a determination is made as to whether the at least one actuator is in the divergent state if the following conditions are satisfied:

the absolute value of the difference $\Delta d_n$ is greater than the threshold S4,
the differences $\Delta d_n$ and $\Delta PC_n$ have opposite signs.

6. The monitoring method according to claim 5, wherein a determination is made as to whether the at least one actuator is in the blocked state if the actuator is not in the divergent state.

7. The monitoring method according to claim 1, wherein, at the time $t_n$, where n is greater than or equal to 1, (iii) if the at least one actuator is in the blocked state, the duration of the alarm phase does not exceed the value $T_{conf2}$, and no hydraulic failure indication is received, or if the at least one actuator is in the divergent state and the duration of the alarm phase does not exceed the value $T_{conf1}$, a determination is made as to whether the alarm phase is closed or whether the steps of the alarm phase are repeated an additional time, based on the presence of an error at the time $t_{n+1}$.

8. The monitoring method according to claim 1, wherein the hydraulic circuit includes a pressure gauge delivering the hydraulic failure indication.

9. The monitoring method according to claim 1, wherein the value $T_{conf2}$ is less than or equal to 500 milliseconds.

10. The monitoring method according to claim 1, wherein the value $T_{conf2}$ is greater than the value $T_{conf1}$.

11. The monitoring method according to claim 1, wherein the value $T_{conf1}$ is less than or equal to 50 milliseconds.

12. A device applied on an aircraft for monitoring movement of at least one actuator, acting on a flight control of the aircraft, the flight control being assisted power-wise by a hydraulic circuit, the hydraulic circuit being able to deliver a hydraulic failure indication, IPH, a displacement servo-control being generated, at a time $t_n$, from a position indication $POS_n$ of the actuator at the time $t_n$ and a position set-point $CDE_n$ computed by a computation unit at the time $t_n$, said device implementing a method according to claim 1, the device comprising:

a detection unit UDET for determining, at the time $t_n$, where n is greater than or equal to 1:
the presence of a servo-control operating error;
whether the monitoring device receives a hydraulic failure indication IPH generated by the hydraulic circuit;
a validation unit UVA for
opening an alarm phase when the presence of an error is detected;
keeping the alarm phase open as long as the detection unit UDET detects the presence of the error;
closing the alarm phase immediately the detection unit UDET no longer detects the presence of an error or immediately the generation, by the computation unit, of the displacement servo-control intended for the at least one actuator is disabled;

a time-stamping unit UDA electronically receiving information from the detection unit UDET for
determining the time $t_o$ at which the alarm phase is opened,
determining, at the time $t_n$, where n is greater than or equal to 1, whether a duration of the alarm phase exceeds a value $T_{conf1}$,
determining, at the time $t_n$, where n is greater than or equal to 1, whether the duration of the alarm phase exceeds a value $T_{conf2}$; and an analysis unit UAN electronically receiving information from the detection unit UDET for determining whether the error is linked to the at least one actuator in the blocked state or to the at least one actuator in the divergent state.

* * * * *